United States Patent
Fan et al.

(10) Patent No.: US 12,164,554 B2
(45) Date of Patent: Dec. 10, 2024

(54) DOCUMENT CLASSIFICATION METHOD AND APPARATUS, AND ELECTRONIC DEVICE

(71) Applicants: State Grid Corporation of China, Beijing (CN); Jiangxi Normal University, Jiangxi (CN)

(72) Inventors: Jinfeng Fan, Beijing (CN); Yong Ma, Beijing (CN); Shiyun Shao, Beijing (CN); Yunni Xia, Beijing (CN); Mengxuan Dai, Beijing (CN); Fan Xu, Beijing (CN); Qi Huang, Beijing (CN); Hui Qian, Beijing (CN); Congjun Zhao, Beijing (CN)

(73) Assignees: State Grid Corporation of China, Beijing (CN); Jiangxi Normal University, Jiangxi (CN)

( * ) Notice: Subject to any disclaimer, the term of this patent is extended or adjusted under 35 U.S.C. 154(b) by 0 days.

(21) Appl. No.: 18/023,991

(22) PCT Filed: Feb. 25, 2022

(86) PCT No.: PCT/CN2022/078051
§ 371 (c)(1),
(2) Date: Feb. 28, 2023

(87) PCT Pub. No.: WO2022/183991
PCT Pub. Date: Sep. 9, 2022

(65) Prior Publication Data
US 2023/0401249 A1 Dec. 14, 2023

(30) Foreign Application Priority Data
Mar. 1, 2021 (CN) .......................... 202110222422.3

(51) Int. Cl.
*G06F 16/35* (2019.01)
*G06F 16/33* (2019.01)

(52) U.S. Cl.
CPC ........ *G06F 16/355* (2019.01); *G06F 16/3344* (2019.01)

(58) Field of Classification Search
CPC .... G06F 16/355; G06F 16/3344; G06F 16/35; G06F 40/20; G06F 18/214; G06F 18/24;
(Continued)

(56) References Cited

U.S. PATENT DOCUMENTS

2003/0130993 A1* 7/2003 Mendelevitch ....... G06F 16/355
2005/0144162 A1* 6/2005 Liang .................... G06F 16/355
(Continued)

FOREIGN PATENT DOCUMENTS

CN 106055538 A 10/2016
CN 106096063 A 11/2016
(Continued)

OTHER PUBLICATIONS

Yan Yan, "Text Representation and Classification with Deep Learning" (with English Abstract) Universitry of Science and Technology Beijing dated Jun. 6, 2016.
(Continued)

*Primary Examiner* — Irete F Ehichioya
*Assistant Examiner* — Xiaoqin Hu
(74) *Attorney, Agent, or Firm* — Patterson + Sheridan, LLP

(57) ABSTRACT

A document classification method includes: obtaining a document; extracting document keywords and a document abstract from the document; determining, according to the document keywords and the document abstract, a first classification label of the document; receiving a second classification label of the document, the second classification label
(Continued)

being determined according to the document keywords, the document abstract, and the first classification label; obtaining a classification efficiency value of the documents, the classification efficiency value indicating a confidence level of the second classification label; and determining the second classification label as a final classification label of the document if the classification efficiency value is greater than or equal to a first threshold. The document classification method described above may improve the speed of document classification by computer, thereby improving the efficiency of document classification.

14 Claims, 7 Drawing Sheets

(58) Field of Classification Search
CPC ...... G06F 18/2415; G06N 3/044; G06N 3/08; G06N 3/045; G06N 5/01; G06N 20/10
See application file for complete search history.

(56) References Cited

U.S. PATENT DOCUMENTS

| | | | |
|---|---|---|---|
| 2018/0349388 A1 | 12/2018 | Skiles et al. | |
| 2020/0137224 A1 | 4/2020 | Rakshit et al. | |
| 2022/0245378 A1* | 8/2022 | Bradley, III | G06V 30/416 |

FOREIGN PATENT DOCUMENTS

| | | |
|---|---|---|
| CN | 107329999 A | 11/2017 |
| CN | 108415959 A | 8/2018 |
| CN | 110866116 A | 3/2020 |
| CN | 111198948 A | 5/2020 |
| CN | 112395412 A | 2/2021 |
| CN | 112579784 A | 3/2021 |

OTHER PUBLICATIONS

Shao et al., "An Efficient Entity Identification Method for Electric Bidding Documents Based on Conditional Random Field", dated Dec. 31, 2020.
International Search Report and Written Opinion, International Application No. PCT/CN2022/078051 dated Apr. 28, 2022.
China Office Action Dated Apr. 9, 2021, Application No. CN202110222422.3.
International Search Report and Written Opinion, International Application No. PCT/CN2022/078051 dated 2-25-20122.
Yan Yan, "Text Representation and Classification with Deep Learning" Universitry of Science and Technology Beijing dated Jun. 6, 2016.
Deshmukh et al., "Support Vector Machine Classifier for Research Discipline Area Selection", dated Jan. 11, 2018.

* cited by examiner

DOCUMENT CLASSIFICATION METHOD AND APPARATUS, AND ELECTRONIC DEVICE

CROSS-REFERENCE TO RELATED APPLICATIONS

This application is a national phase entry under 35 USC 371 of International Patent Application No. PCT/CN2022/078051, filed on Feb. 25, 2022, which claims priority to Chinese Patent Application No. 202110222422.3, filed on Mar. 1, 2021, which are incorporated herein by reference in their entirety.

TECHNICAL FIELD

The present disclosure relates to the field of document classification technologies, and in particular, to document classification method and apparatus, and an electronic device.

BACKGROUND

With the comprehensive application of Internet technology in the fields of new information, new energy, new materials and the like, the number of professional documents is increasing explosively. Such professional documents, as production, operation and maintenance data, are of great significance for summarizing production experience and researching industry development. The classification for professional documents aims to organize and process data of professional documents within an organization in an orderly manner based on understandings for professional work, so as to solve the problem that the documents are disordered and complicated, which is convenient for later review, query and management. Therefore, it is of great significance to realize complete information management by performing effective automatic filing and classification for such documents containing important information of production, operation and maintenance.

SUMMARY

In an aspect, a document classification method is provided. The method includes: obtaining a document, the document being a document to be classified; extracting document keywords and a document abstract from the document; determining, according to the document keywords and the document abstract, a first classification label of the document; receiving a second classification label of the document, the second classification label being determined according to the document keywords, the document abstract, and the first classification label; obtaining a classification efficiency value of the document, the classification efficiency value indicating a confidence level of the second classification label; and determining the second classification label as a final classification label of the document if the classification efficiency value is greater than or equal to a first threshold.

In some embodiments, the method further includes: if the classification efficiency value is less than the first threshold, receiving a third classification label of the document, the third classification label being determined according to the document keywords, the document abstract, and the first classification label; and the final classification label of the document is the third classification label.

In some embodiments, determining, according to the document keywords and the document abstract, the first classification label of the document includes: determining, according to the document keywords and the document abstract, the first classification label of the document through a document classification model. The document classification model includes at least one of a support vector machine (SVM) model, a K-nearestneighbor (KNN) module, a decision tree model, and a classification model based on recurrent neural network.

In some embodiments, the classification efficiency value of the document is determined by at least one efficiency parameter of the document. The at least one efficiency parameter includes at least one of document classification time, a time-consuming ratio, a number of document classification changes, a highest model classification label probability and a manual classification label probability. The time-consuming ratio is a ratio of the document classification time to document classification average time. The document classification average time is an average of document classification time of all classified documents. The highest model classification label probability is a maximum probability of probabilities, each of which is a probability that the classification label of the document is a respective one of classification labels, determined through the document classification model. The manual classification label probability is a reciprocal of a total number of the classification labels.

In some embodiments, if the time-consuming ratio is less than a second threshold, the classification efficiency value is a preset value. If the time-consuming ratio is greater than or equal to the second threshold, the classification efficiency value is determined by the time-consuming ratio, the number of document classification changes, the highest model classification label probability and the manual classification label probability. The classification efficiency value, the time-consuming ratio, the number of document classification changes, the highest model classification label probability and the manual classification label probability satisfy a following relationship: $f=\exp(1-t)*\exp(-c)*P1*P2$. Where f represents the classification efficiency value; $\exp(x)$ represents an x power of e; t represents the time-consuming ratio; c represents the number of document classification changes; P1 represents the model classification label highest probability; P2 represents the manual classification label probability.

In some embodiments, the method further includes: after the final classification label is determined, storing the document, and at least one of the document keywords, the document abstract, the first classification label, the second classification label, a third classification label, the final classification label, the at least one efficiency parameter, and the classification efficiency value.

In some embodiments, the method further includes: if a number of stored documents exceeds a third threshold, training the document classification model by using the stored documents, document keywords, document abstracts and final classification labels of the stored documents as training samples.

In some embodiments, training the document classification model includes determining, according to first classification labels, second classification labels, third classification labels, final classification label and time-consuming ratios of efficiency parameters in the training samples, penalty terms of the training samples.

In some embodiments, determining, according to the first classification labels, the second classification labels, the third classification labels, the final classification labels and the time-consuming ratios of the efficiency parameters in the training samples, the penalty terms of the training samples, includes: for each training sample, if the third classification label is null, and the second classification label is different from the first classification label, and the time-consuming ratio is less than a second threshold determining a penalty term of the training sample as $\alpha$; if the final classification label is the same as the third classification label, and the third classification label is different from the first classification label, determining the penalty term of the training sample as $\beta$; otherwise, determining the penalty term of the training sample as $\gamma$. $\gamma$ is greater than or equal to 1, and is less than or equal to 2; $\alpha$ is greater than or equal to 2 times $\gamma$, and is less than or equal to 4 times $\gamma$; $\beta$ is greater than or equal to 2 times $\alpha$, and is less than or equal to 4 times $\alpha$ ($1 \leq \gamma \leq 2$, $2\gamma \leq \alpha \leq 4\gamma$, $2\alpha \leq \beta \leq 4\alpha$).

In another aspect, a document classification apparatus is provided. The document classification apparatus includes a memory, at least one processor, and computer program instructions stored in the memory and executable by the at least one processor. When the at least one processor executes the computer program instructions, the at least one processor is configured to: obtain a document, the document being a document to be classified; extract document keywords and a document abstract from the document; determine, according to the document keywords and the document abstract, a first classification label of the document; receive a second classification label of the document, the second classification label being determined according to the document keywords, the document abstract and the first classification label; obtain a classification efficiency value of the document, the classification efficiency value indicating a confidence level of the second classification label; and if the classification efficiency value is greater than or equal to a first threshold, determine the second classification label as a final classification label of the document.

In some embodiments, the at least one processor is further configured to: receive a third classification label of the document if the classification efficiency value is less than the first threshold, the third classification label being determined according to the document keywords, the document abstract and the first classification label; and the final classification label of the document is the third classification label.

In some embodiments, the at least one processor is further configured to determine, according to the document keywords and the document abstract, the first classification label of the document through a document classification model. The document classification model includes at least one of a support vector machine (SVM) model, a K-nearestneighbor (KNN) module, a decision tree model, and a classification model based on recurrent neural network.

In some embodiments, the classification efficiency value of the document is determined by at least one efficiency parameter of the document. The at least one efficiency parameter includes at least one of document classification time, a time-consuming ratio, a number of document classification changes, a highest model classification label probability and a manual classification label probability. The time-consuming ratio is a ratio of the document classification time to a document classification average time. The document classification average time is an average of document classification time of all classified documents. The model classification label highest probability is a maximum probability of probabilities, each of which is a probability that the classification label of the document is a respective one of classification labels, determined through the document classification model. The manual classification label probability is a reciprocal of a total number of classification labels.

In some embodiments, if the time-consuming ratio is less than a second threshold, the classification efficiency value is a preset value. If the time-consuming ratio is greater than or equal to the second threshold, the classification efficiency value is determined by the time-consuming ratio, the number of document classification changes, the highest model classification label probability and the manual classification label probability. The classification efficiency value, the time-consuming ratio, the number of document classification changes, the highest model classification label probability and the manual classification label probability satisfy a following relationship: $f = \exp(1-t) \cdot \exp(-c) \cdot P1 \cdot P2$. Where f represents the classification efficiency value; $\exp(x)$ represents an x power of e; t represents the time-consuming ratio; c represents the number of document classification changes; P1 represents the highest model classification label probability; P2 represents the manual classification label probability.

In some embodiments, the memory is configured to store the document, and at least one of the document keywords, the document abstract, the first classification label, the second classification label, a third classification label, the final classification label, the at least one efficiency parameter, and the classification efficiency value after the final classification label of the document is determined.

In some embodiments, the at least one processor is configured to train the document classification model by using stored documents, and document keywords, document abstracts and final classification labels of the stored documents as training samples if a number of the stored documents exceeds a third threshold.

In some embodiments, the at least one processor is further configured to determine, according to first classification labels, second classification labels, third classification labels, final classification labels and time-consuming ratios of efficiency parameters in the training samples, penalty terms of the training samples.

In some embodiments, the at least one processor is further configured to: for each training sample, determine a penalty term of the training sample as $\alpha$ if the third classification label is null, and if the second classification label is different from the first classification label, and if the time-consuming ratio is less than a second threshold; determine the penalty term of the training sample as $\beta$ if the final classification label is the same as the third classification label, and if the third classification label is different from the first classification label; otherwise, determine the penalty term of the training sample as $\gamma$. $\gamma$ is greater than or equal to 1, and is less than or equal to 2; $\alpha$ is greater than or equal to 2 times $\gamma$, and is less than or equal to 4 times $\gamma$; $\beta$ is greater than or equal to 2 times $\alpha$, and is less than or equal to 4 times $\alpha$ ($1 \leq \gamma \leq 2$, $2\gamma \leq \alpha \leq 4\gamma$, $2\alpha \leq \beta \leq 4\alpha$).

In yet another aspect, a non-transitory computer-readable storage medium is provided. The non-transitory computer-readable storage medium stores therein computer program instructions that, when executed by a computer (e.g., a document classification apparatus), cause the computer to perform the document classification method as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may acquire other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
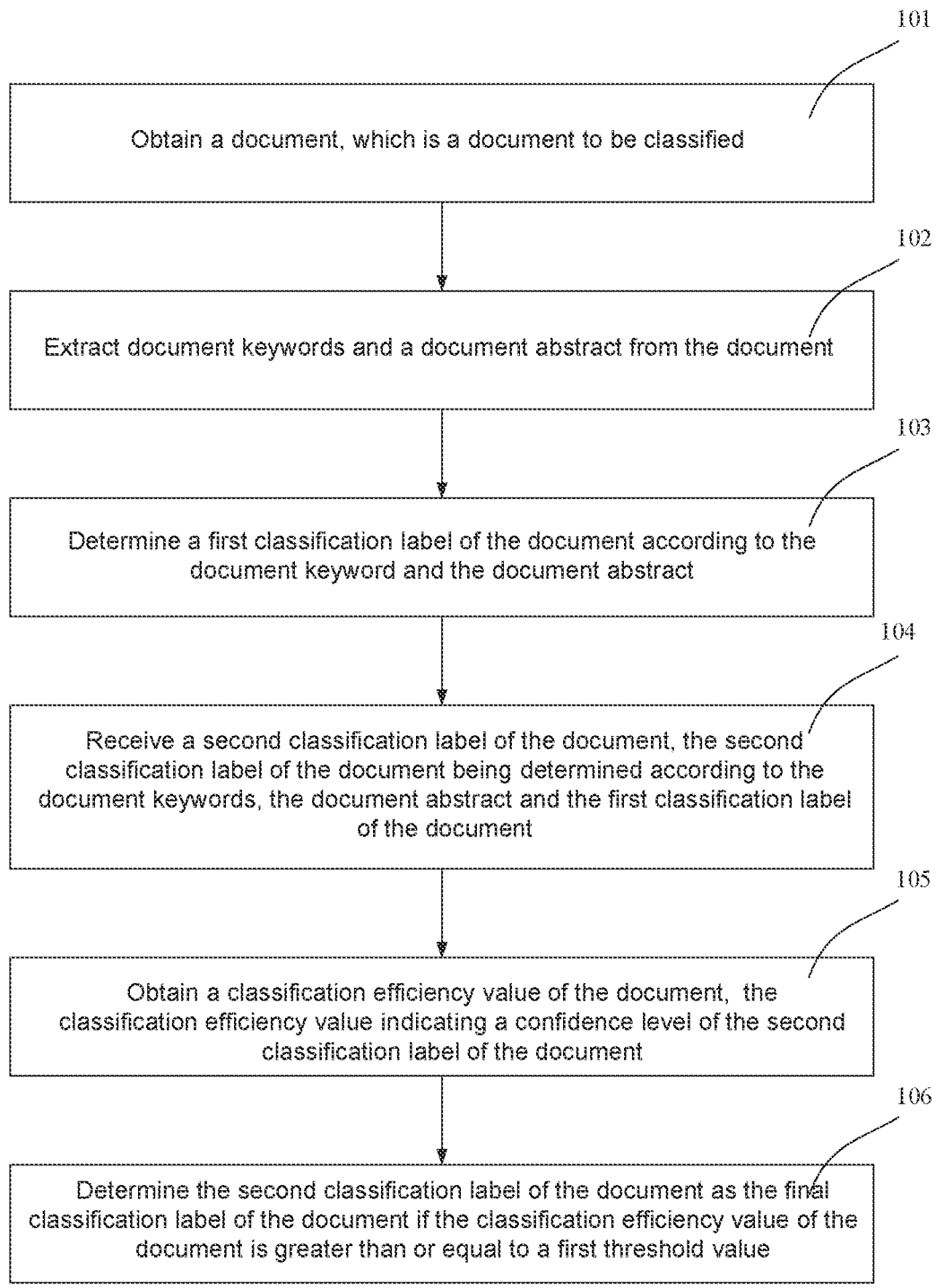
FIG. 1 is a flow diagram of a document classification method, in accordance with some embodiments.

Technical solutions in some embodiments of the present disclosure will be described clearly and completely below with reference to the accompanying drawings. However, the described embodiments are merely some but not all embodiments of the present disclosure. All other embodiments acquired by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, features defined by "first" and "second" may explicitly or implicitly include one or more of the features. In the description of the embodiments of the present disclosure, the term "a plurality of" means two or more unless otherwise specified.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if", depending on the context, is optionally construed as "when", "in a case where", "in response to determining", or "in response to detecting". Similarly, depending on the context, the phrase "if it is determined" or "if [a stated condition or event] is detected" is optionally construed as "in a case where it is determined" or "in response to determining" or "in a case where [the stated condition or event] is detected", or "in response to detecting [the stated condition or event]".

The use of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

Some embodiments of the present disclosure provide a document classification method. The method is performed by, for example, a processor of a computer. As shown in FIG. 1, the method includes steps 101 to 106.

In step 101, a document is obtained, which is a document to be classified.

Considering a document A as an example, the document A may be any type of document to be classified. For example, the document A is a professional document generated by the government and enterprises in the process of production and operation, such as a technological manual, production experience data, and operation and maintenance data.

As an example, the document A may be pre-stored in a memory of the computer. The execution of step 101 means that the processor may retrieve the document A from the memory.

As another example, the document A may be pre-stored in other storage device(s) (e.g., a hard disk or a USB flash drive), and the storage device may communicate with the computer via a communication interface of the computer (e.g., a universal serial bus (USB) interface). The document A may be transferred to the computer via the communication interface of the computer (e.g., the USB interface).

In step 102, document keywords and a document abstract are extracted from the document.

After the processor obtains the document A, the processor may extract document keywords from the document A through a keyword extraction model, and extract a document abstract from the document A through an abstract extraction model.

For example, the keyword extraction model may be a term frequency-inverse document frequency (TF-IDF) keyword extraction method, a Topic-model keyword extraction method, or a rapid automatic keyword extraction (RAKE) method, which is not specially limited in the embodiments of the present disclosure.

The abstract extraction model may be a TextRank algorithm model, a PageRank algorithm model, or a deep learning algorithm model, which is not specially limited in the embodiments of the present disclosure.

In step 103, a first classification label of the document is determined according to the document keywords and the document abstract.

Figure 2:
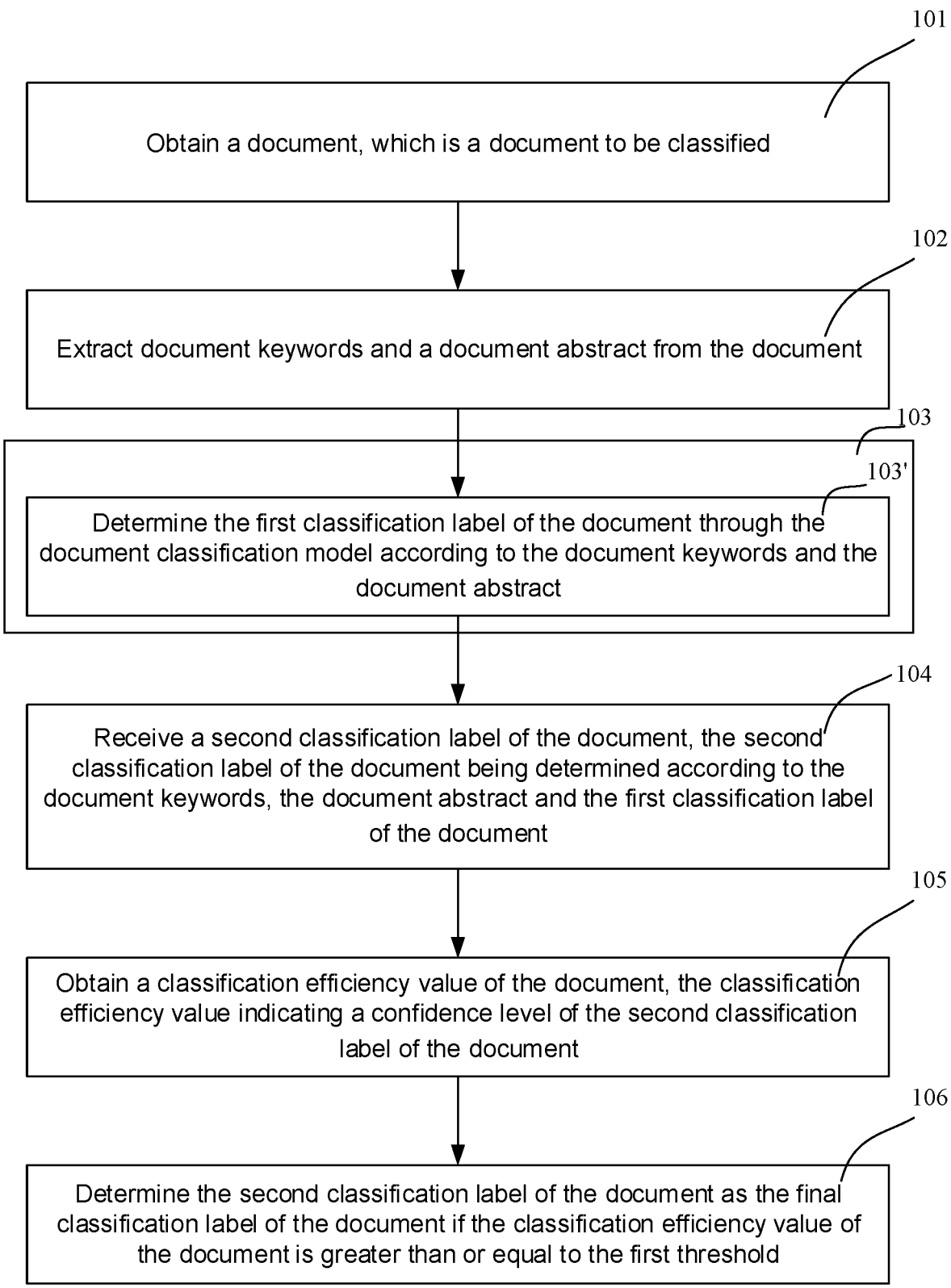
FIG. 2 is a flow diagram of another document classification method, in accordance with some embodiments.

After the processor extracts the document keywords and the document abstract from the document A, the processor may determine a first classification label of the document A through a pre-trained document classification model according to the document keywords and the document abstract of the document A. In this case, as shown in FIG. 2, step 103 may include step 103'.

In step 103', the first classification label of the document is determined through a document classification model according to the document keywords and the document abstract.

The document classification model is a pre-trained document classification model. The document classification model may include at least one of a support vector machine (SVM) model, a K-nearestneighbor (KNN) module, a decision tree model, and a classification model based on recurrent neural network. The document classification model may be pre-stored in the memory of the computer.

The first classification label is one of a plurality of preset classification labels. The plurality of preset classification labels are classification labels that are predetermined according to all possible classifications of the document A. For example, the plurality of preset classification labels are stored in the memory of the computer.

The execution of step 103' means that a classification label is determined, as the first classification label of the document, from the plurality of preset classification labels through the document classification model according to the document keywords and the document abstract.

In step 104, a second classification label of the document is received. The second classification label of the document is determined according to the document keywords, the document abstract and the first classification label of the document.

After the first classification label of the document A is obtained through the document classification model, the document keywords, the document abstract and the first classification label of the document A may be displayed to a first document classification user. The second classification label of the document A is determined by the first document classification user according to the document keywords, the document abstract and the first classification label of the document A. The second classification label and the first classification label may be the same or different.

After the second classification label of the document A is determined by the first document classification user, the second classification label may be input into the processor of the computer by the first document classification user. The processor receives the second classification label input by the user. For example, the second classification label is input through an input device (e.g., a keyboard or a mouse) of the computer by the first document classification user.

The first document classification user may be an ordinary document classification worker. After the document keywords, the document abstract, and the first classification label of the document A are received by the user, the first classification label of the document A may be confirmed by the first document classification user, or the first classification label of the document A may be corrected to the second classification label by the first document classification user.

That is, if the second classification label of the document A is the same as the first classification label, it means that the first classification label has been confirmed by the first document classification user. If the second classification label of the document A is different from the first classification label, it means that the first classification label of the document A has been corrected by the first document classification user, and the second classification label is preferentially determined as the classification label of the document A.

In step 105, a classification efficiency value of the document is obtained, the classification efficiency value indicating a confidence level of the second classification label of the document.

After the processor receives the second classification label of the document A, the processor may determine, according to the confidence level of the second classification label of the document A, whether to use the second classification label of the document A as a final classification label of the document A.

In the embodiments of the present disclosure, the classification efficiency value of the document A indicates the confidence level of the second classification label of the document A. The classification efficiency value of the document A is determined by the processor according to efficiency parameter(s) of the document A.

The efficiency parameter(s) of the document A include at least one of a document classification time of the document A, a time-consuming ratio of the document A, the number of document classification changes of the document A, a highest model classification label probability, and a manual classification label probability.

The time-consuming ratio of the document A is a ratio of a document classification time of the document A to a document classification average time. Here, the document classification time of the document A refers to a time taken by the first document classification user to determine, according to the document keywords, the document abstract and the first classification label of the document A, the second classification label. The document classification average time is an average of the document classification time of all classified documents. A classified document is a document whose final classification label is determined.

The number of document classification changes of the document A refers to the number of changes performed by the first document classification user to the second-classification label in the process of determining the second classification label of the document A. For example, the number of document classification changes of the document A may be determined by the number of times the user inputs second-classification labels through the input device (e.g., the mouse, or the keyboard) of the computer.

The highest model classification label probability is a maximum probability of probabilities, each of which is a probability that the classification label of the document A is a respective one of the classification labels, determined by the processor using the document classification model. For example, in step 103', when the first classification label is to be determined according to the document keywords and the document abstract, the probabilities, each of which is a probability that the document A corresponds to a respective one of the classification labels, may be determined through the document classification model. A classification label with the maximum probability corresponding to the document A is generally determined as the first classification label of the document A. In this case, the highest model classification label probability may also be considered as a probability that the document A corresponds to the first classification label, determined by the processor using the document classification model.

The manual classification label probability is a reciprocal of a total number of the classification labels. The classification labels here refer to the plurality of preset classification labels.

For example, if the time-consuming ratio of the document A is less than a second threshold, the classification efficiency value of the document A is a preset value. For example, the second threshold may be 0.3. The preset value may be 0.8.

It can be understood that, since the time-consuming ratio of the document A is the ratio of the document classification time of the document A to the document classification average time, if the time-consuming ratio of the document A is less than the second threshold, it may be considered that the time taken by the first document classification user to determine, according to the document keywords, the document abstract and the first classification label of document A, the second classification label is short. The short time taken by the first document classification user to determine the second classification label may indicate that the first document classification user is more certain that the document A belongs to the second classification label. Therefore, the confidence level of the second classification label of the document A is high. In this case, the classification efficiency value of the document A may be set to a preset value (e.g., 0.8) to indicate that the confidence level of the second classification label of the document A is high.

For example, if the time-consuming ratio of the document A is greater than or equal to the second threshold, the classification efficiency value of the document A is determined by the time-consuming ratio of the document A, the number of document classification changes of the document A, the highest model classification label probability, and the manual classification label probability.

If the time-consuming ratio of the document A is greater than or equal to the second threshold, the classification efficiency value of the document A, the time-consuming ratio of the document A, the number of document classification changes of the document A, the highest model classification label probability, and the manual classification label probability satisfy a following relationship:

$$f=\exp(1-t)*\exp(-c)*P1*P2.$$

Where f represents the classification efficiency value of the document A; $\exp(x)$ represents the x power of e; t represents the time-consuming ratio of the document A; c represents the number of document classification changes of the document A; P1 represents the highest model classification label probability; P2 represents the manual classification label probability.

In step 106, if the classification efficiency value of the document is greater than or equal to the first threshold, the second classification label of the document is determined as the final classification label of the document.

After the processor obtains the classification efficiency value of the document A, the processor may determine the second classification label of the document A as the final classification label of the document A if the classification efficiency value of the document A is greater than or equal to the first threshold.

For example, the first threshold may be 0.283. The first threshold may be determined according to experiments and debugging, which is not specifically limited in the embodiments of the present disclosure. For example, the first threshold may be pre-stored in the memory of the computer.

Here, the first threshold may be used as a threshold for determining whether the confidence level of the second classification label of the document A is high or low. That is, if the classification efficiency value of document A is greater than or equal to the first threshold, the confidence level of the second classification label of the document A is high. In this case, the second classification label of the document A may be determined as the final classification label of the document A. In this way, by classifying the documents by a computer, it may be possible to improve an efficiency of document classification, and thus reduce costs of document classification. Moreover, through the method described above, a speed at which the computer performs document classification may also be improved. However, if the classification efficiency value of the document A is less than the first threshold, the confidence level of the second classification label of the document A may be low. In this case, in order to improve an accuracy of document classification, the document A may be further classified by a second document classification user (e.g., a classification expert, a technical expert) or the like, so that a third classification label of the document A is determined.

Figure 3:
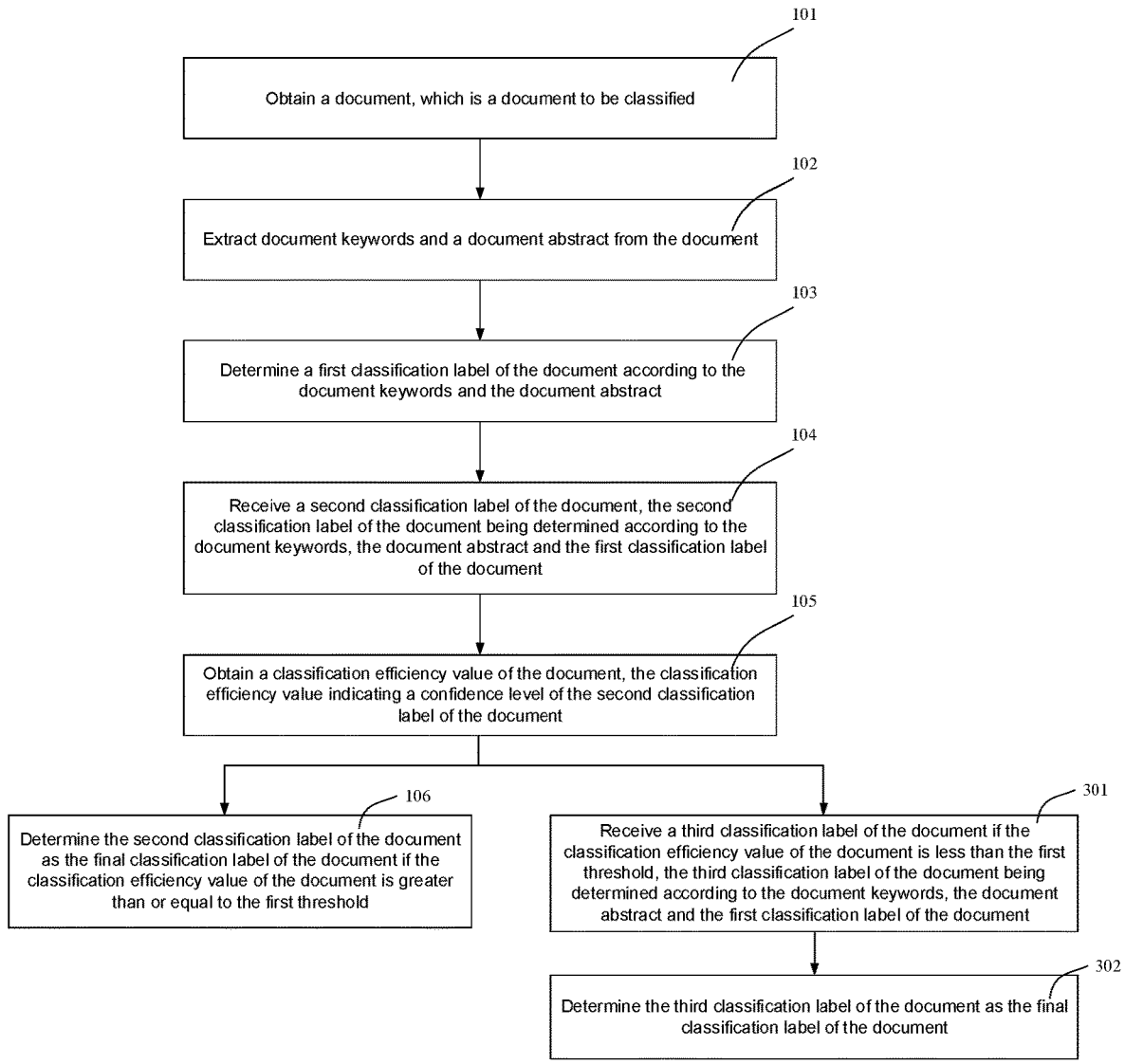
FIG. 3 is a flow diagram of yet another document classification method, in accordance with some embodiments.

Therefore, in some embodiments, as shown in FIG. 3, the document classification method further includes steps 301 and 302.

In step 301, if the classification efficiency value of the document is less than the first threshold, a third classification label of the document is received. The third classification label of the document is determined according to the document keywords, the document abstract and the first classification label of the document.

For example, if the classification efficiency value of the document A is less than the first threshold, the document keywords, the document abstract, and the first classification label of the document A may be displayed to a second document classification user. The third classification label of the document A is determined by the second document classification user according to the document keywords, the document abstract and the first classification label of the document A. The third classification label and the first classification label may be the same or different. The processor may receive the third classification label of the document A. For example, the third classification label is input by the second document classification user through the input device (e.g., a keyboard or a mouse) of the computer.

The second document classification user is generally a document classification expert or a technical expert, by which the classification label of the document A may be finally determined. After the document keywords, the document abstract, and the first classification label of the document A are received by the second document classification user, the first classification label of the document A may be confirmed by the second document classification user, or the first classification label of the document A may be corrected to the third classification label by the second document classification user.

In step 302, the third classification label of the document is determined as the final classification label of the document.

In step 302, the third classification label of the document A is determined as the final classification label of the document A.

Since the third classification label is determined by the second document classification user, the third classification label of the document A can be determined as the final classification label of the document A.

In this way, through the method described above, if the final classification label of the document A is determined, it means that the document classification of the document A is completed.

However, in order to improve the accuracy of the first classification label determined by the document classification model and reduce manual operation, document classification results of the classified documents (e.g., the document A) may be stored, so that the document classification model is trained using data of the document classification results of the classified documents as a new training set. For example, the document classification results of the classified documents may include the classified documents (e.g., the document A), and document keywords, document abstracts, first classification labels, second classification labels, third classification labels and final classification labels of the classified documents.

Figure 4:
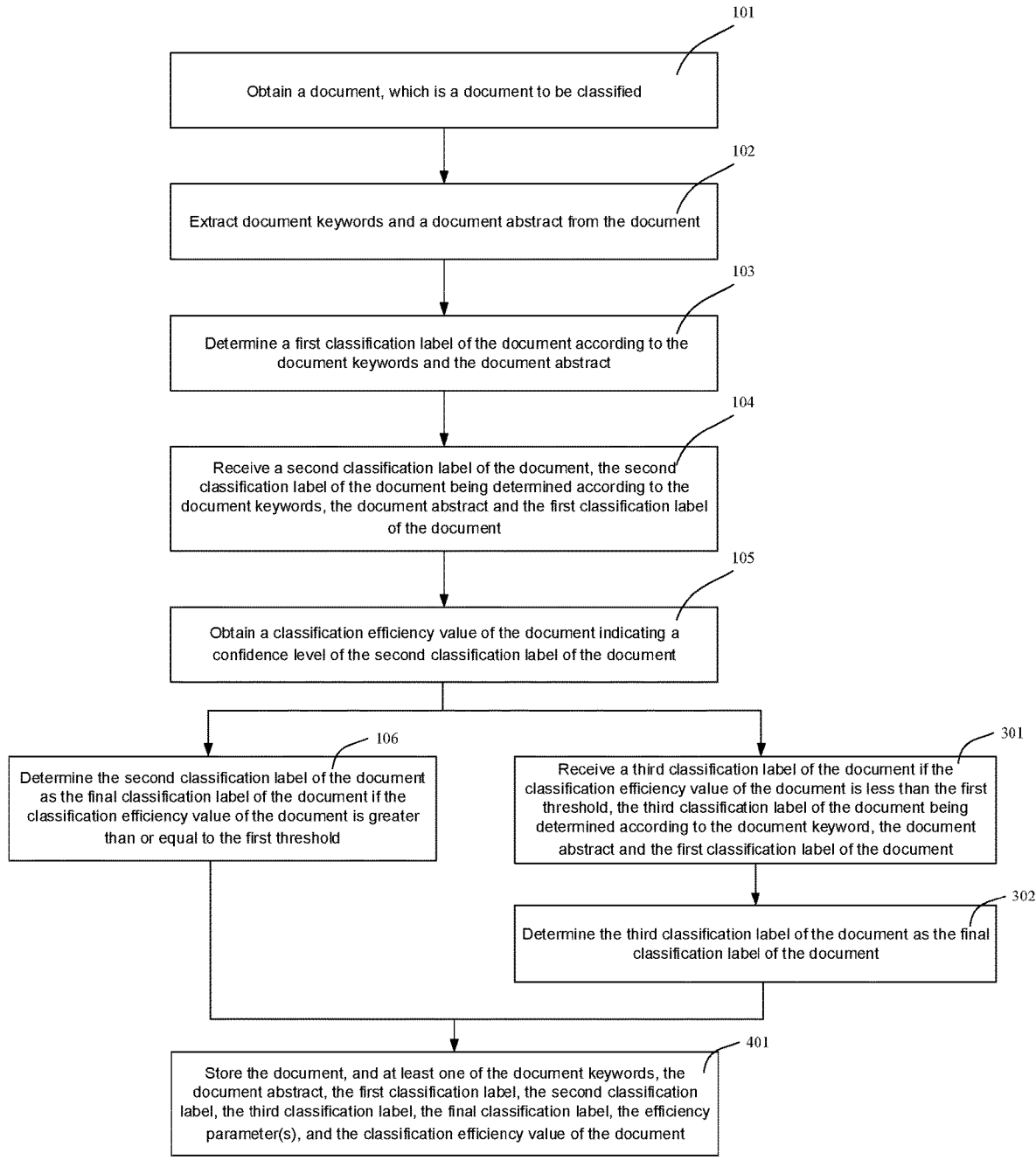
FIG. 4 is a flow diagram of yet another document classification method, in accordance with some embodiments.

Therefore, in some embodiments, as shown in FIG. 4, after the final classification label of the document is determined, the document classification method further includes step 401.

In step 401, the document, and at least one of the document keywords, the document abstract, the first classification label, the second classification label, the third classification label, the final classification label, the efficiency parameter(s), and the classification efficiency value of the document are stored.

It will be understood that after the processor determines the final classification label of the document A, the document A may be changed to a classified document.

If the number of the document classification results of the classified documents stored in step 401 exceeds a certain threshold (e.g., a third threshold), the stored document classification results of all classified documents may be used as training samples to train the document classification model, so as to update the document classification model, which may improve the accuracy of the document classification of the document classification model, thereby reducing the dependence on manual operation as much as possible and reducing the costs of manual operation and time. Moreover, the update of the document classification model may improve the accuracy of the document classification performed by the computer.

Figure 5:
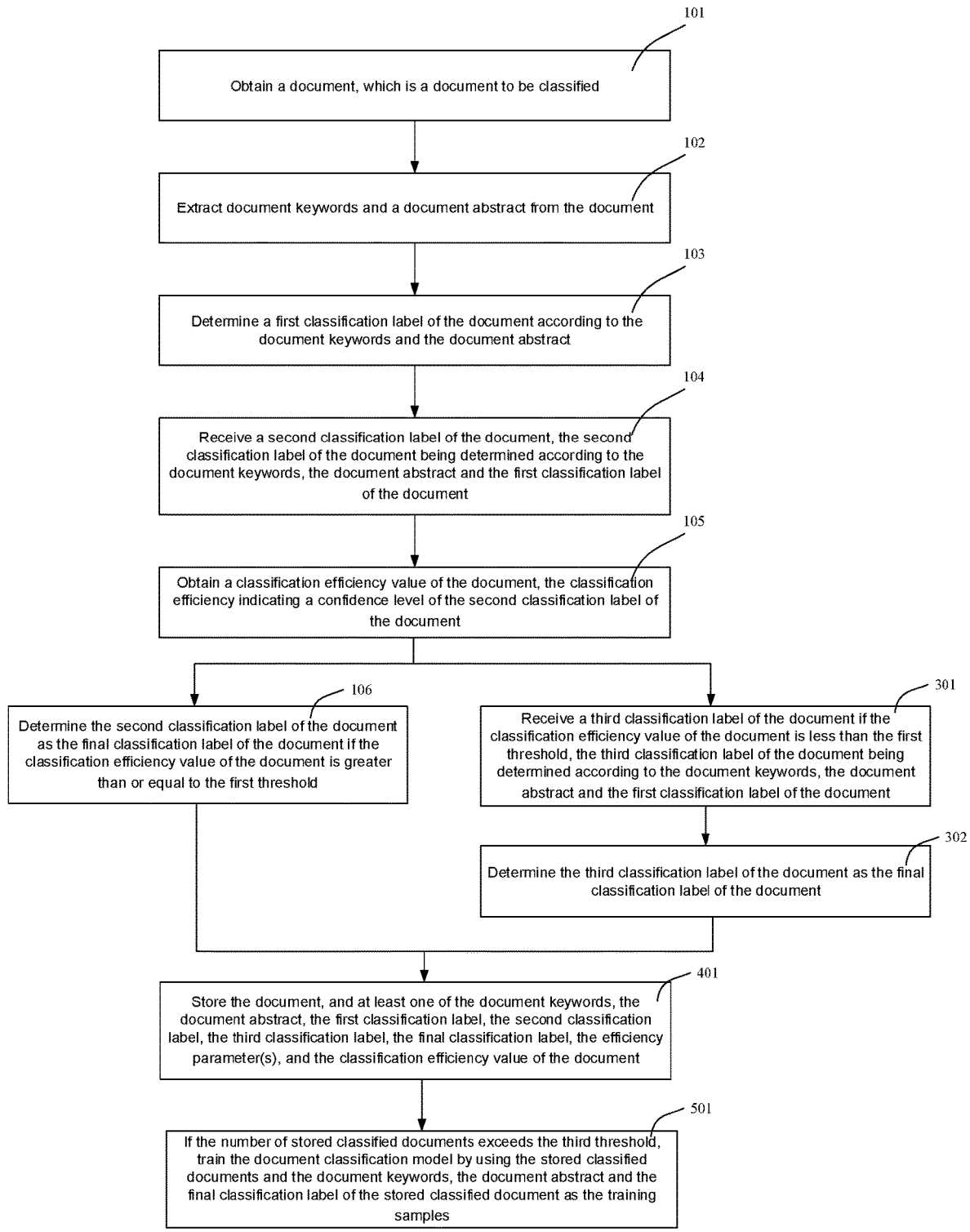
FIG. 5 is a flow diagram of yet another document classification method, in accordance with some embodiments.

Therefore, in some embodiments, as shown in FIG. 5, the document classification method may further include step 501.

In step 501, if the number of stored classified documents exceeds the third threshold, the document classification model is trained by using the stored classified documents and document keywords, document abstracts and final classification labels of the stored classified documents as the training samples.

Training the document classification model may include: for each training sample, determining, according to a first classification label, a second classification label, a third classification label, a final classification label and a time-consuming ratio of the training sample, a penalty term of the training sample.

For example, if the third classification label is null, and the second classification label is different from the first classification label, and the time-consuming ratio is less than the second threshold, the penalty term of the training sample is determined as $\alpha$. If the final classification label is the same as the third classification label, and the third classification label is different from the first classification label, the penalty term of the training sample is determined as $\beta$; otherwise, the penalty term of the training sample is determined as $\gamma$. $\gamma$ is greater than or equal to 1, and is less than or equal to 2; $\alpha$ is greater than or equal to $2\gamma$, and is less than or equal to $4\gamma$; $\beta$ is greater than or equal to $2\alpha$, and is less than or equal to $4\alpha$ ($1 \leq \gamma \leq 2$, $2\gamma \leq \alpha \leq 4\gamma$, $2\alpha \leq \beta \leq 4\alpha$).

It will be understood that the fact that the third classification label is null and the second classification label is different from the first classification label, indicates that the first classification label determined through the document classification model is inaccurate; in addition, the final classification label for this document is determined only by the first document classification user, so the penalty term of this sample should be set to be moderate. The fact that the final classification label is the same as the third classification label and the third classification label is different from the first classification label, indicates that the first classification label determined by the document classification model is inaccurate; moreover, the final classification label is determined by the second classification user, so the penalty term of this sample should be set to the maximum.

Of course, in embodiments of the present disclosure, the keyword extraction model and the abstract extraction model may be trained by using the stored document A, and the document keywords, the document abstract, and the final classification label of the document A as a training sample. For the specific training process, reference may be made to the prior art, and details will not be repeated here.

In some other embodiments, a proportion of documents whose final classification label is the same as the first classification label to all classified documents is counted as a correct rate of the document classification model. If the correct rate of the document classification model is smaller than a set correct rate, the keyword extraction model, the abstract extraction model and the document classification model are trained by using the classified documents, the document abstracts, the document keywords and the final classification labels as training samples, so as to update parameters of the keyword extraction model, the abstract extraction model and the document classification model.

In some other embodiments, the keyword extraction model, the abstract extraction model and the document classification model are trained regularly (e.g., every other week or every other month) by using the classified documents, the document abstracts, the document keywords and the final classification labels as training samples, so as to update the parameters of the keyword extraction model, the abstract extraction model and the document classification model.

In the document classification method described above, the documents are classified, and the document classification model used in the document classification method is trained and updated according to the document classification results. In this way, it may be possible to improve the accuracy of document classification performed by the computer, and thus reduce the manual operation and reduce the costs of manual operation and time.

Figure 6:
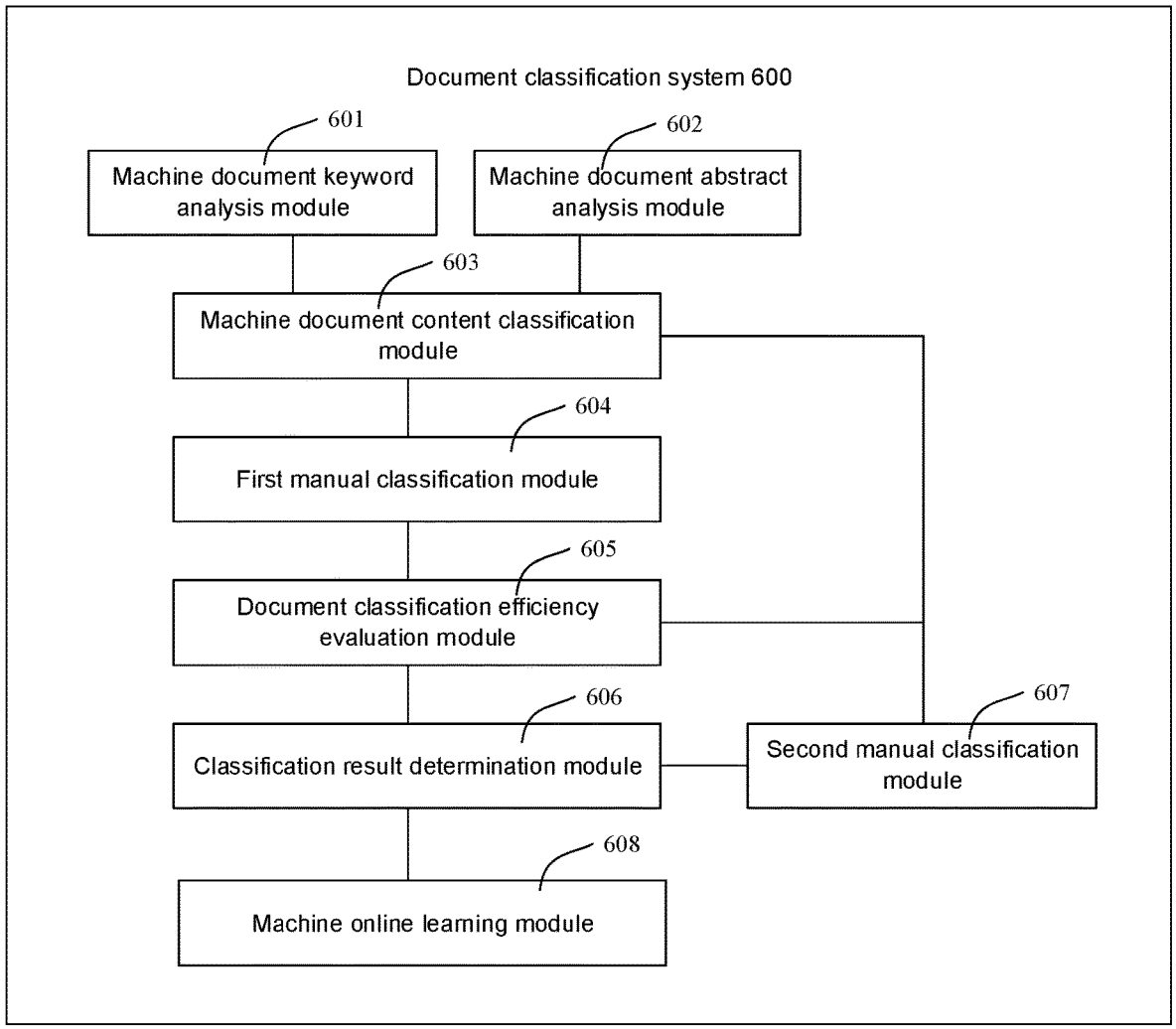
FIG. 6 is a system architecture diagram of a document classification system, in accordance with some embodiments.

Some embodiments of the present disclosure provide a document classification system. As shown in FIG. 6, the document classification system 600 includes a machine document keyword analysis module 601, a machine document abstract analysis module 602, a machine document content classification module 603, a first manual classification module 604, a document classification efficiency evaluation module 605 and a classification result determination module 606.

The machine document keyword analysis module 601 is configured to obtain a document and extract document keywords of the document from the document.

The machine document abstract analysis module 602 is configured to obtain the document and extract a document abstract of the document from the document.

The machine document content classification module 603 is configured to determine, according to the document keywords and the document abstract of the document, a first classification label of the document.

The first manual classification module 604 is configured to receive a second classification label of the document. The second classification label of the document is determined according to the document keywords, the document abstract and the first classification label of the document.

The document classification efficiency evaluation module 605 is configured to obtain a classification efficiency value of the document. The classification efficiency value indicates a confidence level of the second classification label of the document.

The classification result determination module 606 is configured to determine the second classification label of the document as a final classification label of the document if the classification efficiency value of the document is greater than or equal to a first threshold.

In some embodiments, the system further includes a second manual classification module 607. The second manual classification module 607 is configured to receive a third classification label of the document if the classification efficiency value of the document is less than the first threshold. The third classification label of the document is determined according to the document keywords, the document abstract and the first classification label of the document. The classification result determination module 606 is further configured to determine the third classification label of the document as the final classification label of the document if the classification efficiency value of the document is less than the first threshold.

In some embodiments, the classification result determination module 606 is further configured to store the document, and at least one of the document keywords, the document abstract, the first classification label, the second classification label, the third classification label, the final classification label, the efficiency parameter(s), and the classification efficiency value of the document after the final classification label of the document is determined.

In some embodiments, the classification efficiency value of the document is determined by efficiency parameter(s) of the document. The efficiency parameter(s) include at least one of a document classification time, a time-consuming ratio-of the document, the number of document classification changes, a highest model classification label probability, and a manual classification label probability. The time-consuming ratio of the document is a ratio of the document classification time of the document to a document classification average time. The document classification average time is an average of the document classification time of all classified documents. The highest model classification label probability is a maximum probability of probabilities, each of which is a probability that the classification label of the document is a respective one of the classification labels, determined by the processor through the document classification model. The manual classification label probability is a reciprocal of a total number of the classification labels.

In some embodiments, if the time-consuming ratio of the document is less than a second threshold, the classification efficiency value of the document is a preset value. If the time-consuming ratio of the document is greater than or equal to the second threshold, the classification efficiency value of the document is determined by the time-consuming ratio of the document, the number of document classification changes of the document, the highest model classification label probability, and the manual classification label probability. Moreover, the classification efficiency value of the document, the time-consuming ratio of the document, the number of document classification changes of the document, the highest model classification label probability, and the manual classification label probability satisfy the following relationship: $f=\exp(1-t)*\exp(-c)*P1*P2$. Where $f$ represents the classification efficiency value of the document; $\exp(x)$ represents the x power of e; $t$ represents the time-consuming ratio of the document; $c$ represents the number of document classification changes of the document; $P1$ represents the highest model classification label probability; $P2$ represents the manual classification label probability.

In some embodiments, the machine document content classification module 603 is further configured to determine, according to the document keywords and the document abstract of the document, the first classification label of the document through the document classification model. The document classification model may include at least one of the SVM model, the KNN module, the decision tree model, and the classification model based on recurrent neural network.

In some embodiments, the system may further include a machine online learning module 608. The machine online learning module 608 is configured to train the document classification model by using the stored documents, and document keywords, document abstracts, and final classification labels of the documents as training samples if the number of stored documents exceeds a third threshold.

In some embodiments, the machine online learning module 608 is further configured to determine, according to the first classification labels, the second classification labels, the third classification labels, the final classification labels and the time-consuming ratios in the efficiency parameters in the training samples, penalty terms of the training samples.

In some embodiments, the machine online learning module 608 is further configured to: for each training sample, determine a penalty term of the training sample as $\alpha$ if a third classification label is null, and if a second classification label is different from a first classification label, and if a time-consuming ratio is less than the second threshold; determine the penalty term of the training sample as $\beta$ if the final classification label is the same as the third classification label, and if the third classification label is different from the first classification label; otherwise, determine the penalty term of the training sample as $\gamma$. $\gamma$ is greater than or equal to 1, and is less than or equal to 2; $\alpha$ is greater than or equal to 2 times $\gamma$, and is less than or equal to 4 times $\gamma$; $\beta$ is greater than or equal to 2 times $\alpha$, and is less than or equal to 4 times $\alpha$ ($1\leq\gamma\leq2$, $2\gamma\leq\alpha\leq4\gamma$, $2\alpha\leq\beta\leq4\alpha$).

Beneficial effects of the document classification system provided by some embodiments of the present disclosure are the same as beneficial effects of the document classification method described in the above embodiments, and details will not be repeated here.

Figure 7:
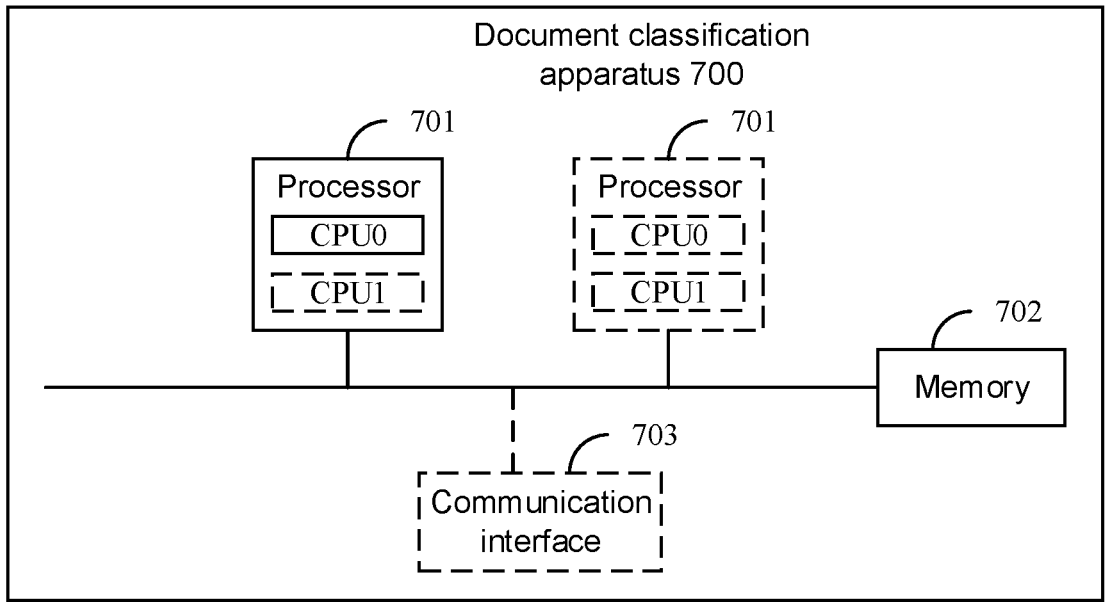
FIG. 7 is a structural diagram of a document classification apparatus, in accordance with some embodiments.

Some embodiments of the present disclosure provide a document classification apparatus. As shown in FIG. 7, the document classification apparatus 700 includes a memory 702, at least one processor 701 and computer program instructions stored in the memory 702 and executable by the at least one processor 701. When the at least one processor 701 executes the computer program instructions, the at least one processor 701 is configured to: obtain a document which is a document to be classified; extract document keywords and a document abstract from the document; determine a first classification label of the document according to the extracted document keywords and the extracted document abstract; receive a second classification label of the document, the second classification label of the document being determined according to the document keywords, the document abstract and the first classification label of the document; obtain a classification efficiency value of the document, the classification efficiency value indicating a confidence level of the second classification label of the document; and determine the second classification label as a final classification label of the document if the classification efficiency value of the document is greater than or equal to a first threshold.

In some embodiments, the at least one processor 701 is further configured to: receive a third classification label of the document if the classification efficiency value is less than the first threshold, the third classification label being determined according to the document keywords, the document abstract and the first classification label; and determine the third classification label as the final classification label of the document.

In some embodiments, the at least one processor 701 is configured to determine, according to the document keywords and the document abstract, the first classification label of the document through a document classification model. The document classification model includes at least one of a support vector machine (SVM) model, a K-nearestneighbor (KNN) module, a decision tree model, and a classification model based on recurrent neural network.

In some embodiments, the classification efficiency value of the document is determined by efficiency parameter(s) of the document. The efficiency parameter(s) include document classification time, a time-consuming ratio, a number of document classification changes, a highest model classification label probability, and a manual classification label probability. The time-consuming ratio is a ratio of the document classification time to a document classification average time. The document classification average time is an average of the document classification time of all classified documents. The highest model classification label probability is a maximum probability of probabilities, each of which is a probability that the classification label of the document is a respective one of the classification labels, determined by the processor through the document classification model. The manual classification label probability is a reciprocal of a total number of the classification labels.

In some embodiments, if the time-consuming ratio of the document is less than the second threshold, the classification efficiency value of the document is a preset value. If the time-consuming ratio of the document is greater than or equal to the second threshold, the classification efficiency value of the document is determined by the time-consuming ratio, the number of the document classification changes, the highest model classification label probability, and the manual classification label probability. The classification efficiency value, the time-consuming ratio, the number of document classification changes, the highest model classification label probability, and the manual classification label probability satisfy the following relationship: $f=\exp(1-t)*\exp(-c)*P1*P2$ Where f represents the classification efficiency value of the document; $\exp(x)$ represents the x power of e; t represents the time-consuming ratio of the document; c represents the number of the document classification changes of the document; P1 represents the highest model classification label probability; P2 represents the manual classification label probability.

In some embodiments, the memory 702 is configured to store, after the final classification label of the document is determined, the document, and at least one of the document keywords, the document abstract, the first classification label, the second classification label, the third classification label, the final classification label, the efficiency parameters, and the classification efficiency value.

In some embodiments, the at least one processor 701 is further configured to train the document classification model using the stored documents, and document keywords, document abstracts and final classification labels of the stored documents as training samples if a number of stored documents exceeds a third threshold.

In some embodiments, the at least one processor 701 is further configured to determine, according to the first classification labels, the second classification labels, the third classification labels, the final classification labels and the time-consuming ratios in the efficiency parameters of the training samples, penalty terms of the training samples.

In some embodiments, the at least one processor 701 is configured to: for each training sample, determine a penalty term of the training sample as $\alpha$ if the third classification label is null, and if the second classification label is different from the first classification label, and if the time-consuming ratio of the efficiency parameter is less than a second threshold; determine the penalty term of the training sample as $\beta$ if the final classification label is the same as the third classification label, and if the third classification label is different from the first classification label; otherwise, determine the penalty term of the training sample as $\gamma$. $\gamma$ is greater than or equal to 1, and is less than or equal to 2; $\alpha$ is greater than or equal to 2 times $\gamma$, and is less than or equal to 4 times $\gamma$; $\beta$ is greater than or equal to 2 times $\alpha$, and is less than or equal to 4 times $\alpha$ ($1 \leq \gamma \leq 2$, $2\gamma \leq \alpha \leq 4\gamma$, $2\alpha \leq \beta \leq 4\alpha$).

Of course, the document classification apparatus 700 may further include a communication interface 703. The communication interface 703 is configured to communicate with other devices. For example, the communication interface 703 may communicate with an input device (e.g., a mouse or a keyboard), so that the document classification apparatus 700 receives the second classification label or the third classification label input by the user.

In addition, some embodiments of the present disclosure provide an electronic device, which may be used to perform the document classification method provided by some of the foregoing embodiments. The electronic device may be any device capable of performing data processing, so as to execute the document classification method provided in some of the foregoing embodiments.

Figure 8:
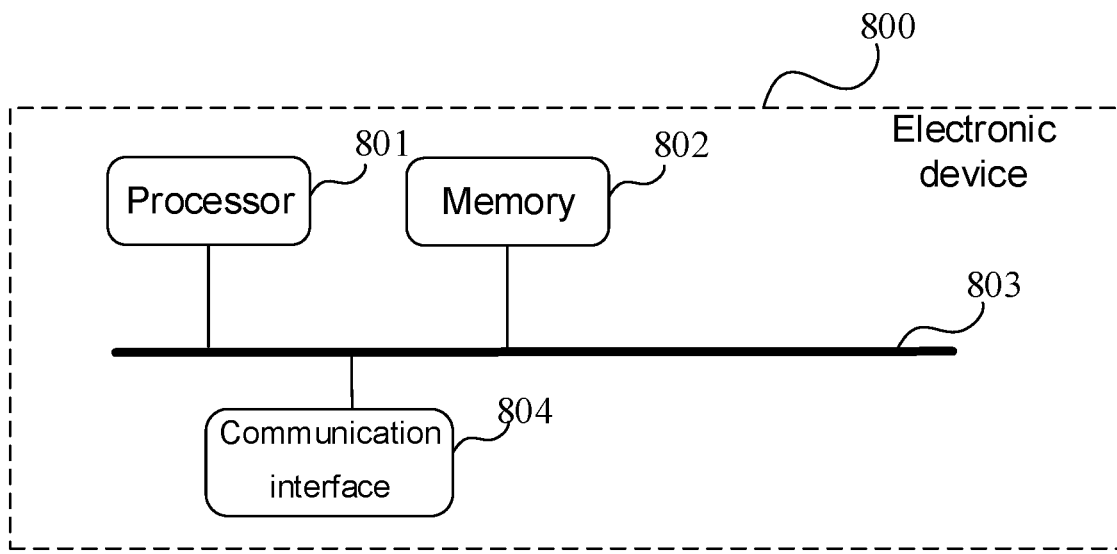
FIG. 8 is a structural diagram of an electronic device, in accordance with some embodiments.

As shown in FIG. 8, the electronic device 800 includes a processor 801, a memory 802, a bus 803 and a communication interface 804. The processor 801, the communication interface 804 and the memory 802 are connected via the bus 803. The memory 802 stores computer program instructions that may be executed by the processor 801. The computer program instructions, when executed by the processor 801, implement the document classification method provided by any of the foregoing embodiments of the present disclosure. It will be understood that the electronic device 800 may be the document classification apparatus 700.

Any memory herein may include a high-speed random access memory (RAM), and may further include a non-volatile memory, such as at least one disk memory. A communication connection between a system network element and at least one other network element is achieved through at least one communication interface 804 (which may be wired or wireless). The communication connection may use the Internet, a wide area network, a local area network, a metropolitan area network, etc.

The bus 803 may be an ISA bus, a PCI bus, an EISA bus, or the like. The bus 803 may be an address bus, a data bus, a control bus, or the like. The memory 802 is used to store programs, and the processor 801 executes the programs upon receiving an execution instruction. The document classification method described in any of the foregoing embodiments of the present disclosure may be applied to the processor 801 or implemented by the processor 801.

Any processor herein may be an integrated circuit chip with a signal processing capability. In the implementation process, each step in the method described above may be implemented by an integrated logic circuit of hardware in the processor 801 or an instruction in the form of software. The processor 701 may be a general-purpose processor, including a central processing unit (CPU), a network processor (NP), etc., and may also be a digital signal processor (DSP), an application specific integrated circuit (ASIC), an field programmable gate array (FPGA) or other programmable logic devices, discrete gate, transistor logic devices, or discrete hardware components. The processor may implement or execute the methods, steps and logic block diagrams described in the embodiments of the present disclosure. The general-purpose processor may be a microprocessor, or may be any conventional processor or the like. The steps of the method described in conjunction with the embodiments of the present disclosure may be directly executed by a hardware decoding processor, or executed by a combination of hardware and software modules in a decoding processor. The software module may be located in a random access memory, a flash memory, a read-only memory, a programmable read-only memory, an electrically erasable programmable memory, a register or other mature storage media in the field. The processor reads information in the memory, and implements the steps of the above methods in combination with its hardware.

Beneficial effects that may be achieved by the electronic device 800 provided by some embodiments of the present disclosure are the same as beneficial effect that may be achieved by the document classification method described in the above-mentioned embodiments, and details will not be repeated here.

Some embodiments of the present disclosure provide a computer-readable storage medium (e.g., a non-transitory computer-readable storage medium). The computer-readable storage medium has stored therein computer program instructions that, when run on a computer (e.g., a document classification apparatus), cause the computer to perform one or more steps of the document classification method described in any of the above embodiments.

For example, the computer-readable storage medium may include, but is not limited to: a magnetic storage device (e.g., a hard disk, a floppy disk or a magnetic tape), an optical disk (e.g., a compact disk (CD), a digital versatile disk (DVD), etc.), a smart card, a flash memory device (e.g., an erasable programmable read-only memory (EPROM), a card, a stick or a key driver, etc.). Various computer-readable storage media described in the embodiments of the present disclosure may represent one or more devices and/or other machine-readable storage media for storing information. The term "machine-readable storage media" may include, but is not limited to, a wireless channel and various other media capable of storing, containing and/or carrying instructions and/or data.

Some embodiments of the present disclosure provide a computer program product. The computer program product includes computer program instructions that, when executed by a computer (e.g., a document classification apparatus), cause the computer to perform the document classification method described in the above embodiments.

Some embodiments of the present disclosure provide a computer program. When the computer program is executed by a computer (e.g., a document classification apparatus), the computer program causes the computer to perform the document classification method described in the above embodiments.

Beneficial effects of the computer-readable storage medium, the computer program product, and the computer program are the same as the beneficial effects of the document classification method as described in some embodiments described above, and details will not be repeated herein.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A document classification method, comprising:
obtaining a document, the document being a document to be classified;
extracting document keywords and a document abstract from the document;
determining, according to the document keywords and the document abstract, a first classification label of the document;
receiving a second classification label of the document, wherein the second classification label is determined according to the document keywords, the document abstract, and the first classification label;
obtaining a classification efficiency value of the document, the classification efficiency value indicating a confidence level of the second classification label; and
when the classification efficiency value is greater than or equal to a first threshold, determining the second classification label as a final classification label of the document;
wherein determining, according to the document keywords and the document abstract, the first classification label of the document, includes: determining, according to the document keywords and the document abstract, the first classification label of the document through a document classification model, wherein the document classification model includes at least one of a support vector machine (SVM) model, a K-nearest-neighbor (KNN) module, a decision tree model, and a classification model based on recurrent neural network;
wherein the classification efficiency value of the document is determined by at least one efficiency parameter of the document; the at least one efficiency parameter includes at least one of document classification time, a time-consuming ratio, a number of document classification changes, a highest model classification label probability and a manual classification label probability;
the time-consuming ratio is a ratio of the document classification time to document classification average time;
the document classification average time is an average of document classification time of all classified documents;
the highest model classification label probability is a maximum probability of probabilities, each of which is a probability that the first classification label of the document is a respective one of classification labels, determined through the document classification model; and the manual classification label probability is a reciprocal of a total number of the classification labels;

wherein when the time-consuming ratio is less than a second threshold, the classification efficiency value is a preset value;

when the time-consuming ratio is greater than or equal to the second threshold, the classification efficiency value is determined by the time-consuming ratio, the number of document classification changes, the highest model classification label probability and the manual classification label probability; and the classification efficiency value, the time-consuming ratio, the number of document classification changes, the highest model classification label probability and the manual classification label probability satisfy a following relationship:

$$f=\exp(1-t)*\exp(-c)*P1*P2;$$

wherein f represents the classification efficiency value; exp(x) represents an x power of e; t represents the time-consuming ratio; c represents the number of document classification changes; P1 represents the highest model classification label probability; P2 represents the manual classification label probability.

2. The method according to claim 1, further comprising:
when the classification efficiency value is less than the first threshold, receiving a third classification label of the document, wherein the third classification label is determined according to the document keywords, the document abstract, and the first classification label; and the final classification label of the document is the third classification label.

3. The method according to claim 1, further comprising:
after the final classification label is determined, storing the document, and at least one of the document keywords, the document abstract, the first classification label, the second classification label, a third classification label, the final classification label, the at least one efficiency parameter, and the classification efficiency value.

4. The method according to claim 3, further comprising:
when a number of stored documents exceeds a third threshold, training the document classification model by using the stored documents, and document keywords, document abstracts and final classification labels of the stored documents as training samples.

5. The method according to claim 4, wherein training the document classification model includes:
determining penalty terms of the training samples according to first classification labels, second classification labels, third classification labels, the final classification labels and time-consuming ratios of efficiency parameters in the training samples.

6. The method according to claim 5, wherein determining, according to the first classification labels, the second classification labels, the third classification labels, the final classification labels and the time-consuming ratios of the efficiency parameters in the training samples, the penalty terms of the training samples, includes:
for each training sample:
when a third classification label is null, and a second classification label is different from a first classification label, and a time-consuming ratio is less than a second threshold, determining a penalty term of the training sample as α;

when a final classification label is the same as the third classification label, and the third classification label is different from the first classification label, determining the penalty term of the training sample as β; and otherwise, determining the penalty term of the training sample as γ, wherein γ is greater than or equal to 1, and is less than or equal to 2; α is greater than or equal to 2 times γ, and is less than or equal to 4 times γ; β is greater than or equal to 2 times α and is less than or equal to 4 times α.

7. A document classification apparatus, comprising a memory, at least one processor, and computer program instructions stored in the memory and executable by the at least one processor, wherein when the at least one processor executes the computer program instructions, the at least one processor is configured to:

obtain a document, the document being a document to be classified;

extract document keywords and a document abstract from the document;

determine, according to the document keywords and the document abstract, a first classification label of the document;

receive a second classification label of the document, wherein the second classification label is determined according to the document keywords, the document abstract and the first classification label;

obtain a classification efficiency value of the document, the classification efficiency value indicating a confidence level of the second classification label; and when the classification efficiency value is greater than or equal to a first threshold, determine the second classification label as a final classification label of the document;

wherein the at least one processor is configured to determine, according to the document keywords and the document abstract, the first classification label of the document through a document classification model, wherein the document classification model includes at least one of a support vector machine (SVM) model, a K-nearestneighbor (KNN) module, a decision tree model, and a classification model based on recurrent neural network;

wherein the classification efficiency value of the document is determined by at least one efficiency parameter of the document; the at least one efficiency parameter includes at least one of document classification time, a time-consuming ratio, a number of document classification changes, a highest model classification label probability and a manual classification label probability;

the time-consuming ratio is a ratio of the document classification time to document classification average time;

the document classification average time is an average of document classification time of all classified documents;

the highest model classification label probability is a maximum probability of probabilities, each of which is a probability that the first classification label of the document is a respective one of classification labels, determined through the document classification model; and the manual classification label probability is a reciprocal of a total number of the classification labels;

wherein when the time-consuming ratio is less than a second threshold, the classification efficiency value is a preset value;

when the time-consuming ratio is greater than or equal to the second threshold, the classification efficiency value is determined by the time-consuming ratio, the number of document classification changes, the highest model classification label probability and the manual classification label probability; and the classification efficiency value, the time-consuming ratio, the number of document classification changes, the highest model classification label probability and the manual classification label probability satisfy a following relationship:

$$f=\exp(1-t)*\exp(-c)*P1*P2;$$

wherein f represents the classification efficiency value; $\exp(x)$ represents an x power of e; t represents the time-consuming ratio; c represents the number of document classification changes; P1 represents the highest model classification label probability; P2 represents the manual classification label probability.

8. The apparatus according to claim 7, wherein the at least one processor is further configured to: receive a third classification label of the document when the classification efficiency value is less than the first threshold, the third classification label being determined according to the document keywords, the document abstract and the first classification label; and the final classification label of the document is the third classification label.

9. The apparatus according to claim 7, wherein the memory is configured to store the document, and at least one of the document keywords, the document abstract, the first classification label, the second classification label, a third classification label, the final classification label, the at least one efficiency parameter, and the classification efficiency value after the final classification label of the document is determined.

10. The apparatus according to claim 9, wherein the at least one processor is further configured to train the document classification model by using stored documents, and document keywords, document abstracts and final classification labels of the stored documents as training samples when a number of the stored documents exceeds a third threshold.

11. The apparatus according to claim 10, wherein the at least one processor is configured to:

determine penalty terms of the training samples according to first classification labels, second classification labels, third classification labels, the final classification labels and time-consuming ratios of efficiency parameters in the training samples.

12. The apparatus according to claim 11, wherein the at least one processor is configured to:

for each training sample, determine a penalty term of the training sample as α when the third classification label is null, the second classification label is different from the first classification label, and the time-consuming ratio is less than a second threshold;

determine the penalty term of the training sample as β when the final classification label is the same as the third classification label, and the third classification label is different from the first classification label; and otherwise, determine the penalty term of the training sample as γ, wherein γ is greater than or equal to 1, and is less than or equal to 2; α is greater than or equal to 2 times γ, and is less than or equal to 4 times γ; β is greater than or equal to 2 times α, and is less than or equal to 4 times α.

13. An electronic device comprising a memory, at least one processor, and computer program instructions stored in the memory and executable by the at least one processor, wherein the computer program instructions, when executed by the at least one processor, cause the electronic device to perform the method according to claim 1.

14. A non-transitory computer-readable storage medium having stored therein computer program instructions that, when run on a computer, cause the computer to perform the method according to claim 1.

* * * * *